Feb. 5, 1924.
C. H. WHITE
1,482,496
DISK HARROW MECHANISM
Filed Aug. 4, 1919
3 Sheets-Sheet 1
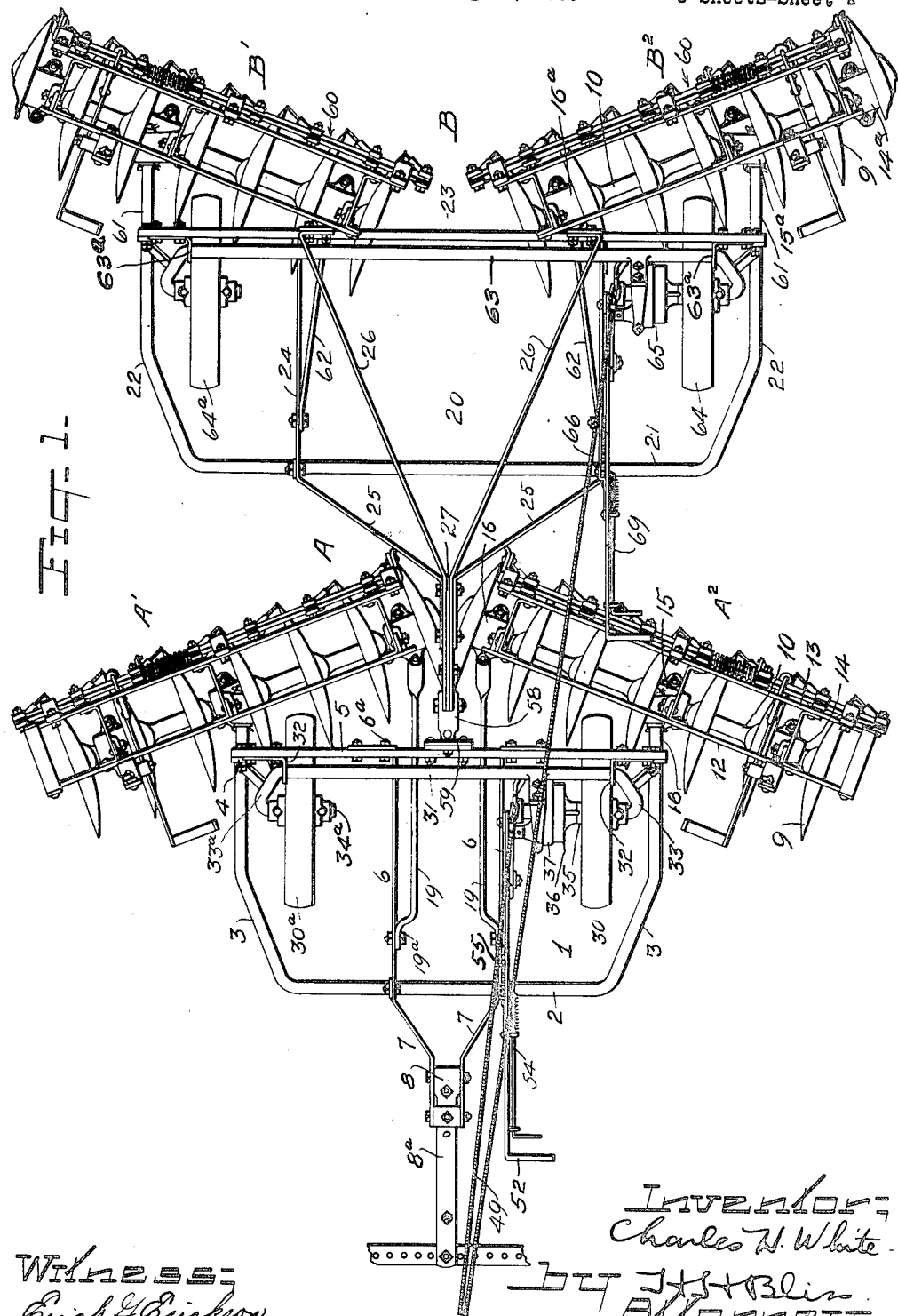

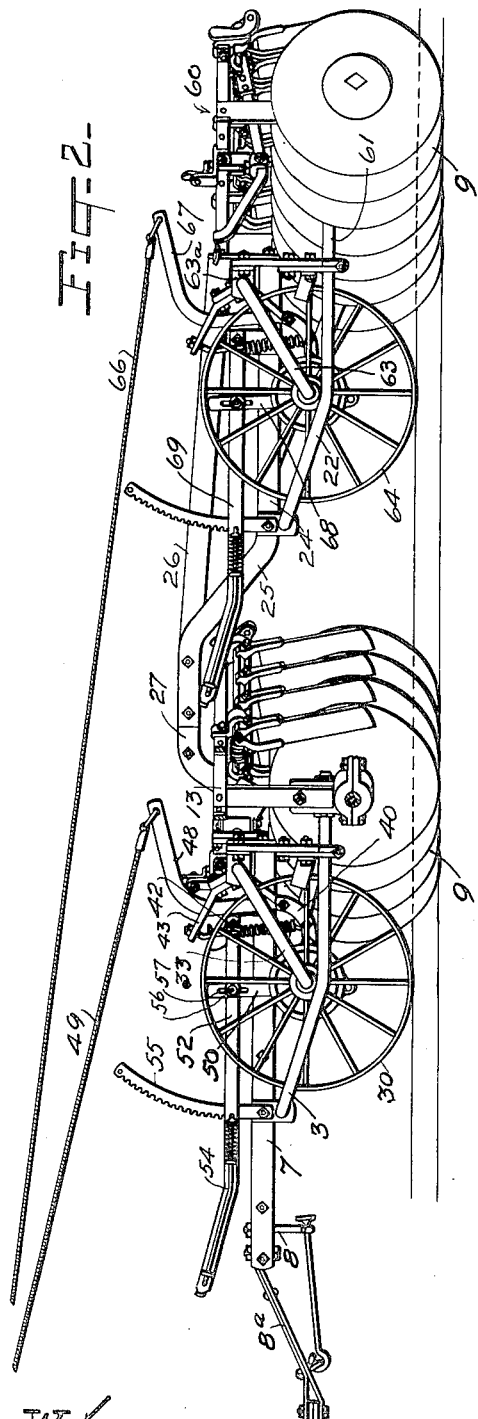

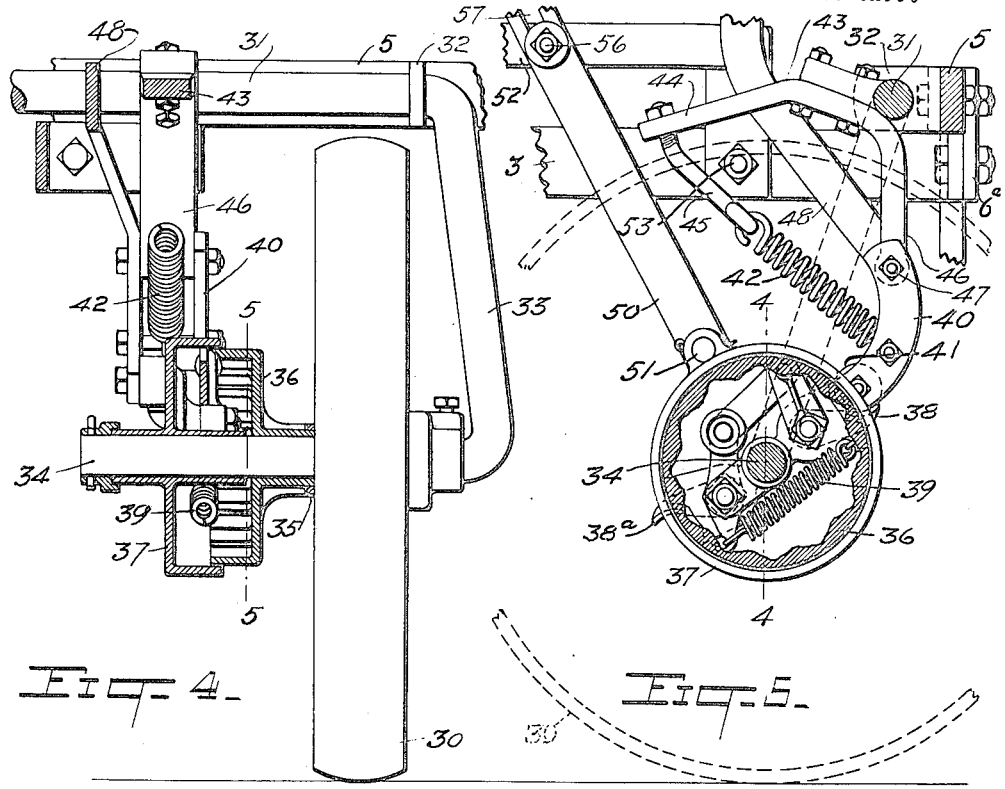

Patented Feb. 5, 1924.

1,482,496

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK-HARROW MECHANISM.

Application filed August 4, 1919. Serial No. 315,089.

*To all whom it may concern:*

Be it known that I, CHARLES H. WHITE, citizen of the United States, residing at Moline, in the county of Rock Island and State of Illinois, have invented certain new and useful Improvements in Disk-Harrow Mechanisms, of which the following is a specification, reference being had therein to the accompanying drawing.

This invention relates to improvements in disk harrow apparatus of the class including those each of which comprises a frame and one or more pairs of disk gangs, the gangs of each pair being arranged to be inclined oppositely to each other when in operation in relation to the line of advance.

One of the objects is to provide a support for the disk gangs having traction devices from which power can be derived for lifting the gangs and for lowering them.

Another object is to provide a mechanism by which this can be done in such way that it will not be necessary to vary the angular positions of the gangs or to throw them from a position of transverse alignment to one of rearward inclination.

Where the entire apparatus comprises, say, two pairs of gangs, another object is to provide traction-driven power lifting parts which will permit the rear gangs to be raised and lowered independently of the front gangs, and vice versa.

In the drawings,

Figure 1 is a top plan view of a disk harrow apparatus embodying my improvements;

Figure 2 is a side elevation showing the operative parts in the positions occupied when at work;

Figure 3 is a side view similar to that in Fig. 2, except that the operative parts are in the positions occupied when they are inactive;

Figure 4 is a view in section on line 4—4 of Fig. 5, the power transmitting devices for lifting the frame and the disks, some of the adjacent parts being shown in elevation;

Figure 5 is a view partly in section taken on the line 5—5 of Fig. 4 showing the last said parts.

The operative parts of this disk harrowing apparatus are supported on a suitable framework. That shown comprises a U-shaped frame 1 having a front cross bar 2 and end bars 3 with their forward parts inclined inward, a transverse member in the form of a cross bar 5 near the rear ends of the end bars and joined to the end bars by suitable connecting devices at 4. A draft frame is connected to the frame 1, it having bars each indicated by 6, 7, relatively near the central vertical planes. The section 6 of each of said bars extends back, and is rigidly connected at $6^a$ to the rear cross bar 5. The forward sections 7 are inclined inward and secured to the spacing and bracing devices at 8 by which the draft devices, behind the engine, at $8^a$ are joined to the harrow mechanism.

The framework described supports and permits draft to the disk mechanism A. This is in two elements, the disks being in two sets of gang elements $A^1$, $A^2$. Each gang comprises the disks 9 supported by a shaft at their axes, there being sleeves 10 and bosses of the usual type for spacing and holding them rigidly in relation to each other and to the axle or shaft. Each gang has two or more boxes 14, 15, 16 in which the gang axle is mounted. A superadjacent frame is supported by these boxes, it having uprights secured to the boxes and extending to planes above the disk, together with longitudinally arranged connecting bars 12, 13. This superadjacent framework supports the scraper system, that shown comprising a rocking bar which carries a scraper for each of the disks, and with which there is combined a spring for causing the scrapers, at option, to be pressed against the disk surfaces.

Each disk gang is supported in relation to the frame 1 by means of arms 18 rigid with and extending backward from the main frame and at their ends connected to the intermediate boxes 15, 15 of the gang system. These arms 18 can, as shown, be extensions of the frame bars 3. As will be explained more fully, the design of the mechanism herein is such that the flexibility of connection between the disk gang, respectively, and the main frame (which permits the gangs to vibrate in horizontal planes) is dispensed with; that machine not having laterally swinging links, or equivalents, at the outer ends of the gangs or the swinging or adjustable drag bars interposed between the frame and the inner ends of the gangs which are common in other constructions. The present mechanism has its parts so organized that there is no necessity for the inner ends of the gangs to be moved forward or backward or to allow them to move bodily longitudinally inward. They should have the capability of rocking vertically at their ends around a horizontal line transverse to the plane of their longitudinal axis in order to permit the gangs to conform to variations in the surface of the soil.

To permit the latter movement, the arms 18 at their rear ends serve as journals mounted in bearings carried by the disk axle boxes.

The drag bars 19 are at 19ª connected to the main frame at their forward ends, and at their rear ends are connected to the innermost boxes 16 of the gangs. As above noted, these drag bars are thus connected with a fixed adjustment not being provided, as is common in disk harrow structures, with levers connected to the front ends and designed for throwing them longitudinally forward and back.

To compensate for this rigidity of connection of the disk gangs, that is, rigidity with respect to longitudinal movement bodily and in respect to their being movable from one angle to the line of draft to another angle, I connect the gangs to the frame in such way that if the latter be bodily moved vertically, the gangs will be similarly moved. The common practice has been to connect the gangs to the main frame that the gangs can, at option, have their axes brought to alignment transversely, or, can, at option, have their inner ends thrown backward or forward to put the gangs, as entireties, in one angle or another to the draft. The object in bringing them to alignment is to so position the disks of the two series that they will serve merely as wheels to support the gangs and the frame, the disks, when aligned, not being positioned to penetrate the soil. When thus aligned, they are taken along the roads to or from the fields and are taken across a field in these relative positions when it is not desired to have them furrow the surface. But it has been long recognized that there are many disadvantages incident to the disks in this way. Under many circumstances the soil surface is such that although they do not form wide furrows, they will penetrate to some extent. And if the surface is hard, as along roadways, the disk edges are worn and lose their desirable sharpness and are even broken and marred.

One of the objects of the present design is to avoid the necessity of bringing the disks to alignment and prevent their edges from being marred or broken when depended upon as a multiple wheel-like support.

30, 30ª are wheels combined with the frame and gang systems in such way that they can, on the one hand, be utilized to support the frame and the disks in relatively elevated positions for the disks will be out of contact with the ground or, on the other hand, so that the frame and disks can be relatively lowered to permit the latter to penetrate the soil surface to the desired depth.

These wheels are carried by a rock shaft or arched axle 31. It is mounted in bearings at 32 secured to the transverse member 5 of the frame. The shaft has arms 33, 33ª which are positioned, respectively, outside of the wheels 30, 30ª, these arms carrying inwardly turned spindles 34, 34ª on which the wheels are mounted. The hub part 35 of wheel 30 is formed with, or locked to, a rotary clutch element 36 rotating continuously with its ground wheel on the spindle 34. Loosely mounted on the spindle, and adjacent to the element 36, is an optionally driven clutch element 37. As concerns many of the details of the devices 36, 37, it is to be noted that they can be of any of several well known sorts, provided they are adapted to be quickly locked together when the operator makes a movement (as, for instance, when he pulls a cord) and are also adapted to thereafter transmit to the driven element 37 a predetermined amount of rotary movement (as a one-half revolution) and further provided that they are adapted to have the driven part 37 automatically and quickly stopped and locked in position at the end of each of its movements.

As shown, the driven element 37 of this transmitter is provided with a relatively movable dog 38 which, when in one position, permits the two elements 36, 37 to be locked together, and, when in another position, separates the interlocking element so that the driving part 36 runs free of the driven part 37. This swinging dog 38 is moved to one position (that of interlocking) by a spring 39, and to its other position by a manually movable dog 40 provided with a roller 41 in planes of rotation of the dog 38. It is, by a spring 42, brought to the position where it lies within the path of the dog 38. The spring 42 is carried by an arm 43 rigidly secured to the rock shaft 31, this arm having one end part 44 bent to such position that it can carry the holder and adjuster 45 for the spring and, at the other end 46, is bent so as to carry the pivot device 47 on which the dog 40 rocks. Rigidly connected with the dog 40 is a lever 48 and to this lever is connected a cord 49 which extends to the operator's platform on the engine.

The driven element 37 of the power transmitter is arranged to abut against the frame and the part carried thereby. The abutting action is effected through a link 50 which, at its lower end, is pivoted as at 51 to said driven rotary element 37.

If the operator desires to lower the disk gangs, the parts being in the positions shown in Figs. 3, 4 and 5, he exerts a short pull on cord 49. This rocks the roller-carrying dog 40 backward, and releases the dog 38. Thereupon the spring 39 interlocks the continuously cutting power transmitting element 36 with the normally stationary element 37, and the ground wheel 30 immediately puts into rotation the part 37. The operator releases the cord 49 immediately after exerting the short pull, that is, immediately after the dog 38 moves beyond the roller-carrying dog 40.

As soon as the element 37 begins to rotate, it carries the hinge at 51 and the link 50 downward, the weight of the frame and of the gangs causing them to follow the link in its descent. This downward movement continues until the link hinge 51 has moved through a half revolution. At the instant the hinge finishes the movement of 180°, the second dog 38ᵃ strikes the roller 41 of dog 40 and the dog 38ᵃ disengages the interlocking parts and the driven element 37 stops moving. The frame and the disks are now in their lowermost position. It has been assumed during the latter part of the description that the mechanism of the machine, as an entirety, is moving forward bodily and that the disks, as soon as they impinge on the soil surface, sink into it to the predetermined depth, such, for example, as is shown in Figure 2.

When the operator desires to elevate the frame and the disks as, for example, when turning at the end of a field of traverse, or when desiring to transport the machine with the operative parts in idle elevated positions, he exerts another short pull upon the cable 49. This disengages the roller dog 40 from the movable dog 38ᵃ and the spring 39 again interlocks the transmitting elements. The hinge at 51 and the link 50 are now subjected to a pushing force as the part 37 moves through a half rotation, or from the dotted position in Figure 5, through a half revolution to their uppermost position. While doing so, that exerts a lifting action on the frame and the disk gangs which continues during a half revolution of the part 37 and at the end of such half revolution the roller carrying dog 40 is impinged on by the dog 38 which disengages the interlocking parts of the transmitter. Thereafter the elevated parts remain in their elevated position as in Figure 3, until it is again desired that the disks should enter the ground.

Devices are provided for varying the positions of the supporting and thrusting link 50 in relation to the frame, the disk gangs and the wheel supports. The thrust from the link is transmitted to the frame through an adjustable bar or lever 52. It is pivoted at 53 to the frame at its rear end. At its front end it can be locked after vertical adjustment by a detent 54 and a rack segment 55. The thrust link 50 is pivotally connected at 56 to this lever 52. The connecting pivot 56 passes through a slot 57 in link 50 so that there can be sufficient play of the link to meet the various requirements.

The harrow mechanism illustrated comprises not only the parts that have been above described, but also a rear disk harrow system having operative parts arranged in tandem relative to those that have been referred to.

There is a rear U-shaped frame indicated as a whole by 20 and to it a disk harrow apparatus, indicated as an entirety by B, is attached, the latter comprising two disk gangs B¹, B².

The frame 20 comprises draft bars 24, 25, inclined top brace bars 26, a front relatively low cross bar 21, outer end bars 22, and a rear cross bar or transverse member 23. The front parts 25 of the bars 24—25 converge forwardly and are brought close to the front ends of the bars 26 to form a strong bar 27, part of which is in horizontal planes above those of the front disk gangs and the forward part of which is turned downward to provide an element for flexibly connecting the rear frame with the front frame above described. The front end of this composite bar 27 is connected to a bracket 58 which is pivotally connected to a bracket 59 secured to the central part of the front frame. The pivot devices at 58, 59 are in relatively low horizontal planes, being, preferably, as nearly as possible, in horizontal planes of the front gang axles when the machine is in operation. The rear gangs B¹, B² may be substantially similar to the front gang as concerns the details of construction. Their disks, however, are turned so as to be positioned relatively oppositely in comparison with the positions of the front disks. That is to say, the disks of the rear gang have their concaved sides turned inward instead of outward. Each rear gang has boxes at 14ᵃ, 15ᵃ and 16ᵃ similar to those at 14, 15 and 16. And upon these boxes there is supported a superadjacent frame 60 carrying scrapers as above described. Each gang is connected to the rear frame by arms 61, preferably extensions of the frame bars 22, the rear end parts of these arms 51 being respectively journaled in the gang boxes 15ᵃ. The inner ends of the gangs are connected by links or drag bars 62 to the rear frame, these drag bars and the arms 61 permitting sufficient rocking movement of each gang at its ends.

The rear frame is provided with ground wheels 64, 64ª mounted on the end portions of an arched axle 63 journaled in bearings 63ª on the transverse member 23. With the ground wheel 64 there is combined a power transmitting system of parts at 65 similar to that above described. A truck cable 66 extends from the engine platform to the rear lever 67 by which the operator can, at option, throw into, or out of, action the power transmitting parts which effect the lifting and lowering of the rear gangs, these parts having a thrusting and holding link 68 engaging with the frame, or with a lever 69 adjustably interposed between the link and the frame, the arrangement here used being substantially the same as that described for the corresponding parts of the front harrow unit.

There are times when it becomes desirable to throw the front disk system or the rear system out of action independently of the other. In finishing a traverse of a field the front disks will reach the end of the soil to be harrowed considerably sooner than the rear disks reach it. And at the time of making a turn, it is desirable to have the rear disks operating for a period after those at the front have been lifted and carried more or less around for the return. When the parts are constructed and arranged as described, the double disking actions can be continued to the end of the traverse. All of the laborious efforts necessary required at such times for throwing the gang systems to or from alignment, are obviated. The disk gangs for these engine drawn mechanisms are large and heavy. And with an apparatus, such as described, all that is required of the operator is to exert a slight pull upon a cord and the work to be done is accomplished automatically and under power.

After the turn has been made at the end of traverse no time is lost in bringing the disks instantly to work at the pre-determined angles as they are dropped from their elevated to their lowermost positions which so angulated. Nor is any wide margin of soil traveled over without the disks being in their angulated position as is the case with the ordinary harrow apparatus requiring that, while the gangs advance the system, their disks should be moving from inoperative to operative position.

The wheels are placed close to the devices which connect the frame to the gangs and the middle parts of the latter receive the upward lifting strains from the power devices. The loads on the disks of the gangs are severe when the lifting commences.

A comparatively long swinging movement is given to the crank elements 33 and 33ª and both the cranks serve as toggle elements in lifting the weight. The slotted link 50 provides for a free though limited movement of the frame and disks up and down relatively to the wheels and to the cranks.

When the machine is in operation the disks normally carry the weight within the ordinary working limits. If under any circumstances the disks and the frame move downward to the limit they finally bear positively downward on the link 50 and on the traction wheel, and while excessive suction is acting on the disks the wheels take the thrust and serve as supports for the frame and for the disks. If the conditions are of the opposite sort, that is, are such as to cause the disks to rise relatively in the soil, they will lift the frame, cause it to rise, until the pin at 56 reaches the upper end of the slot 57, and then the weight of the wheels and that of the cranks, the axle systems and the attachments acts to increase the weight normally resting upon the disks and the latter are held properly to their work.

What I claim is:

1. A multiple gang disk harrow comprising front and rear frames, the rear frame being connected to the front frame to swing about a substantially vertical axis, transversely disposed arched axles carried by said frames respectively, ground wheels mounted on the end portions of said arched axles, ground wheel actuated front and rear lifting devices operable optionally and independently of each other for swinging said axles to lift said frames, and disk gangs connected with said frames and arranged to be lifted from the ground by the swinging of said arched axles.

2. A multiple gang disk harrow having in combination a main frame, two oppositely angled disk gangs carried by the frame, a rocking axle extending from side to side of the frame and having at each end a rigid crank, ground wheels on said cranks, the wheels and the disks of the gangs being adapted to alternatively provide rolling supports for the frame, a second frame extending rearward from and secured by a central vertical pivot to the main frame, two disk gangs secured to the second frame, a rocking axle extending from side to side of said second frame and having at each end a rigid crank, ground wheels on the latter cranks, power devices actuated by a front ground wheel for lifting the front frame and its disk gangs, power devices actuated by a rear ground wheel for lifting the rear frame and its disk gangs, and means for controlling the actions of said power devices.

3. A multiple gang disk harrow having in combination a main frame, two oppositely angled disk gangs carried by the frame and held permanently at fixed inclinations relatively thereto, a rocking axle extending from side to side of the frame and having at each end a rigid crank, wheels on the said cranks, the wheels and the disks of the gangs being adapted to alternatively provide rolling supports for the frame, a second frame extending rearward from and secured by a central vertical pivot to the aforesaid frame, two disk gangs secured to the second frame and permanently held at fixed angles relatively thereto, two ground wheels respectively mounted at the sides of the rear frame and adapted to bodily swing around the said vertical pivot, power devices actuated by a front wheel for lifting the front frame and disk gangs, power devices actuated by one of the rear ground wheels for lifting the rear frame and its disk gangs, and means extending to points in front of the front frame for controlling the actions of said power lifting devices.

4. The combination of the ground-engaging traction wheel normally traveling continuously in contact with the ground, the frame movable vertically relatively to the wheel, the disk gangs carried by the frame and permanently rigidly held in substantial horizontal parallelism and at a fixed working angle to the frame, the power devices comprising a link actuated by the wheel and adapted to bear against an abutment on the frame, said link being movable endwise independently of said abutment and within fixed limits, and means for adjusting the position of said abutment, the frame and gangs being adapted to move vertically relatively to the power devices.

5. The combination with a ground engaging wheel, a frame movable vertically relatively to said wheel, soil turning devices carried by said frame, power devices comprising a link actuated by said wheel and adapted to bear against an abutment on said frame, said link having a longitudinal slot which receives such abutment, and permits relative endwise movement of said link independently of the abutment within fixed limits, and means for adjusting the position of the abutment, the frame and soil turning devices being adapted to move vertically relatively to the power devices.

6. A multiple gang disk harrow comprising front and rear frames arranged tandem and pivotally connected for relative swinging about a substantially vertical axis, each of said frames consisting of a substantially U-shaped member disposed with its separated ends toward the rear, and a transverse member connecting the rear portions of said frame members forward of the ends thereof, disk gangs connected with the rear end portions of said frame members back of said transverse members, transversely disposed arched axles pivotally supported by said transverse members respectively, ground wheels mounted on the end portions of said axles, and means for swinging said axles to raise said disk gangs.

7. A multiple gang disk harrow comprising front and rear frames arranged tandem and pivotally connected for relative swinging about a substantially vertical axis, each of said frames consisting of a substantially U-shaped member disposed with its separated ends toward the rear, and a transverse member connecting the rear portions of said frame members forward of the ends thereof, disk gangs connected with the rear end portions of said frame members back of said transverse members, transversely disposed arched axles pivotally supported by said transverse members respectively, front and rear ground wheels mounted on the end portions of said axles, and optionally controlled traction operated means associated with said front and rear ground wheels respectively for swinging said axles to raise said disk gangs.

In testimony whereof, I affix my signature.

CHARLES H. WHITE.